United States Patent
Nakajima et al.

(10) Patent No.: US 9,102,231 B2
(45) Date of Patent: Aug. 11, 2015

(54) WAVE SUPPRESSION STRUCTURE FOR FUEL TANK

(75) Inventors: Takeaki Nakajima, Wako (JP); Daisuke Nohara, Wako (JP); Kiyofumi Shida, Wako (JP); Shinya Murabayashi, Wako (JP); Hiroaki Watanabe, Wako (JP); Kengo Kobayashi, Wako (JP); Seiji Yagura, Yokohama (JP)

(73) Assignees: Honda Motor Co., Ltd., Tokyo (JP); Nifco Inc., Kanagawa (JP)

( * ) Notice: Subject to any disclaimer, the term of this patent is extended or adjusted under 35 U.S.C. 154(b) by 121 days.

(21) Appl. No.: 13/254,214

(22) PCT Filed: Mar. 3, 2010

(86) PCT No.: PCT/JP2010/053388
§ 371 (c)(1),
(2), (4) Date: Sep. 12, 2011

(87) PCT Pub. No.: WO2010/101165
PCT Pub. Date: Sep. 10, 2010

(65) Prior Publication Data
US 2011/0315699 A1 Dec. 29, 2011

(30) Foreign Application Priority Data
Mar. 4, 2009 (JP) ................. 2009-050622

(51) Int. Cl.
*B60K 15/077* (2006.01)
*B60K 15/03* (2006.01)

(52) U.S. Cl.
CPC ..... *B60K 15/077* (2013.01); *B60K 2015/03118* (2013.01); *B60K 2015/0775* (2013.01); *Y10T 137/86212* (2015.04)

(58) Field of Classification Search
USPC ................... 220/563–564, 734; 137/574, 582
See application file for complete search history.

(56) References Cited

U.S. PATENT DOCUMENTS 2,218,063 A * 10/1940 Munzer ......................... 181/275
2,552,119 A * 5/1951 Scharenberg ................. 220/563
(Continued)

FOREIGN PATENT DOCUMENTS

CN 1519468 A 8/2004
JP 9-202149 A 8/1997
(Continued)

*Primary Examiner* — Anthony Stashick
*Assistant Examiner* — Robert Poon
(74) *Attorney, Agent, or Firm* — Carrier Blackman & Associates, P.C.; Joseph P. Carrier; Fulchand P. Shende

(57) ABSTRACT

A wave suppression structure for a fuel tank is provided in which a wave suppression member (37) disposed in the interior of a tank main body of the fuel tank is formed from a basket-shaped container (38) and cylindrical porous members (39), the basket-shaped container (38) being formed from two members, first and second half bodies (38L, 38R), two of the porous members (39) being supported in the interior of each of the first and second half bodies (38L, 38R), wherein the wave supporting member (37) is supported on a fuel suction pipe (36) by joining the first and second half bodies (38L, 38R) of the basket-shaped container (38) so as to sandwich a fuel suction pipe (36) between a through hole (38*f*) thereof. This enables attachment of the wave suppression member (37) to the fuel suction pipe (36) to be completed without carrying out a cumbersome operation of inserting the fuel suction pipe (36) through the through hole (38*f*) of the basket-shaped container (38) or the interior of the porous member (39), thereby greatly improving the ease of attachment.

7 Claims, 5 Drawing Sheets

(56) References Cited

U.S. PATENT DOCUMENTS

| | | | |
|---|---|---|---|
| 3,349,953 A * | 10/1967 | Conaway et al. | 220/734 |
| 4,764,408 A * | 8/1988 | Stedman et al. | 428/71 |
| 6,062,417 A * | 5/2000 | Evans | 220/563 |
| 6,308,856 B1 * | 10/2001 | Spickelmire | 220/563 |
| 6,408,979 B1 * | 6/2002 | Forbes et al. | 181/198 |
| 6,431,388 B1 * | 8/2002 | Spickelmire et al. | 220/563 |
| 7,648,749 B1 * | 1/2010 | Taylor | 428/98 |
| 2003/0015537 A1 | 1/2003 | Konja | |
| 2009/0133762 A1 * | 5/2009 | Watanabe et al. | 137/565.01 |
| 2011/0017748 A1 * | 1/2011 | Palma et al. | 220/562 |

FOREIGN PATENT DOCUMENTS

| | | |
|---|---|---|
| JP | 2004-322996 A | 11/2004 |
| JP | 2005-289247 A | 10/2005 |
| JP | 2005-335436 A | 12/2005 |
| JP | 2007-237843 A | 9/2007 |
| JP | 2010-012981 A | 1/2010 |

* cited by examiner

WAVE SUPPRESSION STRUCTURE FOR FUEL TANK

TECHNICAL FIELD

The present invention relates to a wave suppression structure for a fuel tank in which a wave suppression member housing in a basket-shaped container a hollow porous member having formed therein a large number of holes for giving resistance to the passage of fuel is disposed in the interior of a tank main body, and by making piping disposed in the interior of the tank main body extend through a through hole formed in the basket-shaped container, the wave suppression member is supported at a predetermined position.

BACKGROUND ART

Patent Document 1 below describes an arrangement in which, by sectioning the interior of a tank main body 11 blow molded using a synthetic resin into a first chamber 24 and a second chamber 25 by means of a narrow passage 23, a baffle plate (wave suppression plate) effect is exhibited in the passage 23.

PRIOR ART DOCUMENT

Patent Document

Patent Document 1: Japanese Patent Application Laid-open No. 2005-335436

SUMMARY OF THE INVENTION

Problems to be Solved by the Invention

The above-mentioned conventional arrangement has the problem that, due to the passage 23 being formed integrally in the interior of the tank main body 11, the degree of freedom in design of the tank main body 11 is inhibited, and also has the problem that it is difficult to give a wave suppression effect to an existing tank main body 11 that does not have a passage 23.

The present applicant has proposed in Japanese Patent Application No. 2008-175537 a wave suppression structure for a fuel tank in which a wave suppression member formed from a basket-shaped container housing a porous member that gives resistance to the passage of fuel is disposed in the interior of a tank main body, the wave suppression member being supported by making piping disposed in the interior of the tank main body extend through a through hole formed in the basket-shaped container.

In accordance with this wave suppression structure for a fuel tank, it becomes possible to obtain an efficacious wave suppression effect without inhibiting the degree of freedom in design of the tank main body, but there is the problem that not only is the operation of making piping extend through the through hole formed in the basket-shaped container cumbersome, but also the ease of attachment is poor because of the porous member housed in the interior of the basket-shaped container interfering with the operation of inserting the piping.

The present invention has been accomplished in light of the above-mentioned circumstances, and it is an object thereof to enhance the ease of operation when attaching to piping a wave suppression member formed from a basket-shaped container housing a porous member.

Means for Solving the Problems

In order to attain the above object, according to a first aspect of the present invention, there is provided a wave suppression structure for a fuel tank in which a wave suppression member housing in a basket-shaped container a hollow porous member having formed therein a large number of holes for giving resistance to the passage of fuel is disposed in the interior of a tank main body, and by making piping disposed in the interior of the tank main body extend through a through hole formed in the basket-shaped container the wave suppression member is supported at a predetermined position, wherein the basket-shaped container is formed from two members joined so as to sandwich the piping, and the porous member is housed in the basket-shaped container so that an outer face of the porous member opposes an inner face of the basket-shaped container and an outer face of the piping.

Further, according to a second aspect of the present invention, in addition to the first aspect, a plurality of the porous members are housed in the interior of the basket-shaped container.

Furthermore, according to a third aspect of the present invention, in addition to the first or second aspect, the porous member has a cylindrical shape.

A fuel suction pipe 36 of an embodiment corresponds to the piping of the present invention, and first and second half bodies 38L and 38R of the embodiment correspond to the two members of the present invention.

Effects of the Invention

In accordance with the first aspect of the present invention, since the basket-shaped container is formed from two members joined so as to sandwich the piping and the porous member is housed in the basket-shaped container so that the outer face of the porous member opposes the inner face of the basket-shaped container and the outer face of the piping, merely joining the two members of the basket-shaped container, provisionally housing the porous member, so as to sandwich the outer periphery of the piping enables attachment of the wave suppression member to the piping to be completed without carrying out a cumbersome operation of inserting the piping through the through hole of the basket-shaped container or the interior of the porous member, thereby greatly improving the ease of attachment.

Furthermore, in accordance with the second aspect of the present invention, since the plurality of porous members are housed in the interior of the basket-shaped container, the frequency of fuel colliding with the porous members increases, thus enhancing the wave suppression effect.

Moreover, in accordance with the third aspect of the present invention, since the porous member has a cylindrical shape, an efficacious wave suppression effect can be exhibited regardless of the direction from which fuel collides with the porous member.

Figure 1:
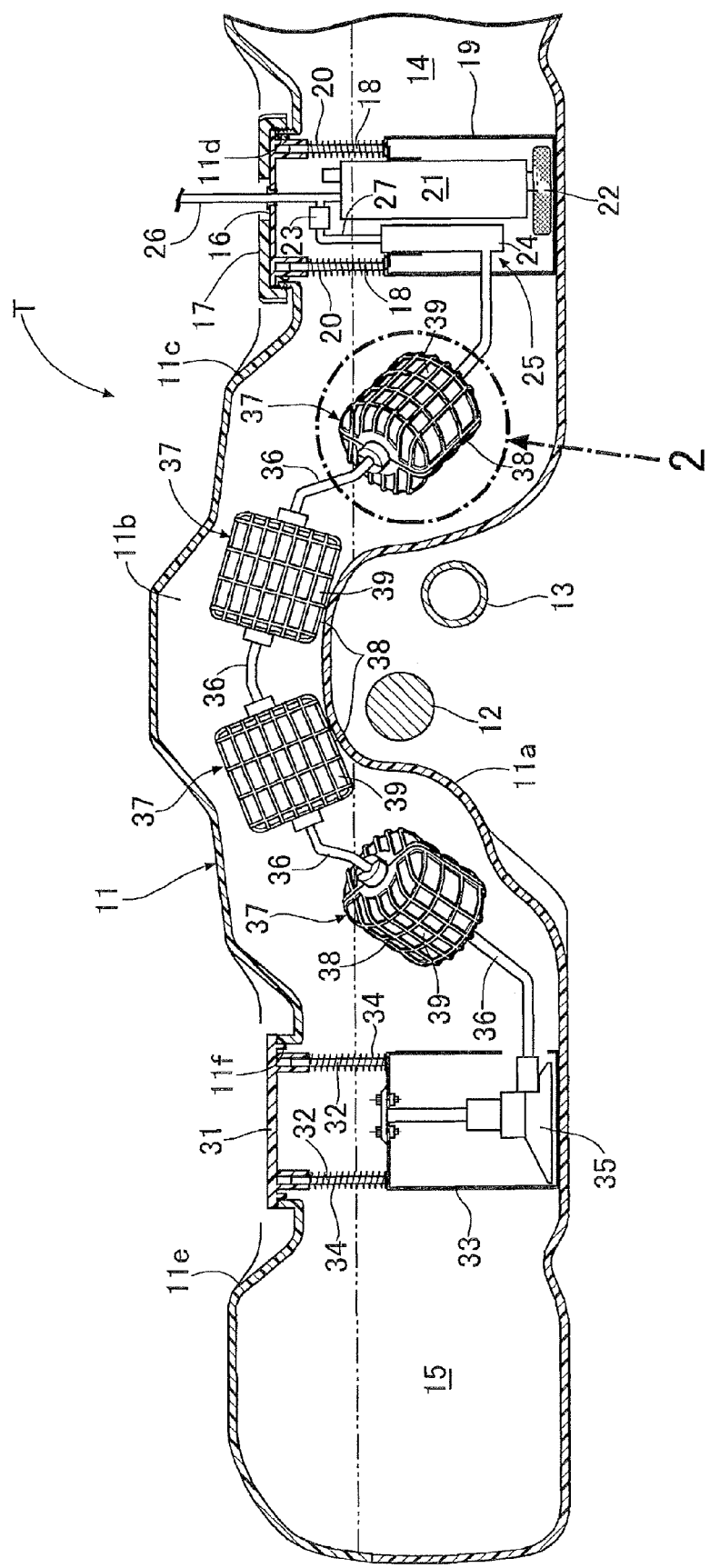
FIG. 1 is a vertical sectional view of a vehicular fuel tank. (first embodiment)

EXPLANATION OF REFERENCE NUMERALS
AND SYMBOLS

11 Tank main body
36 Fuel suction pipe (piping)
37 Wave suppression member
38 Basket-shaped container
38L First half body (two members)
38R Second half body (two members)
38f Through hole
39 Porous member

MODES FOR CARRYING OUT THE INVENTION

A first embodiment of the present invention is explained below by reference to FIG. 1 to FIG. 4.

First Embodiment

As shown in FIG. 1, a fuel tank T mounted on a lower face of a floor panel of an automobile vehicle body rear part includes a tank main body 11 blow-molded from a resin, and a propeller shaft 12 for transmitting the driving force of an engine to a rear wheel and an exhaust pipe 13 for guiding exhaust gas of the engine to the rear of the vehicle body are disposed in a groove-shaped recess 11a extending in the fore-and-aft direction in a central part in the left-and-right direction of a lower face of the tank main body 11. The tank main body 11 is sectioned by means of the recess 11a into a first tank chamber 14 on the right side and a second tank chamber 15 on the left side, and the first and second tank chambers 14 and 15 communicate with each other via a communication portion 11b above the recess 11a.

A first opening 11d having a male thread on the outer periphery is formed on an upper wall 11c of the first tank chamber 14, and a first cover body 16 for closing the first opening 11d is fixed while maintaining airtightness by means of a cap 17 having a female thread that is screwed onto the male thread. An upper part of a first chamber 19 with an open upper face is fixed to a plurality of guide rods 18 vertically slidably supported on a lower face of the first cover body 16, and a lower face of the first chamber 19 downwardly urged by the resilient force of coil springs 20 provided on the outer periphery of the guide rods 18 abuts against an upper face of the bottom wall of the first tank chamber 14.

Provided in the interior of the first chamber 19 is a pump module 25 formed from a fuel pump 21, a suction filter 22, a pressure regulator 23, and a jet pump 24. The fuel pump 21 supplies fuel that has been sucked up via the suction filter 22 disposed on the base part of the first chamber 19 to the engine via a fuel supply pipe 26 extending through the first cover body 16 and extending to the exterior of the tank main body 11. The pressure regulator 23 is provided partway along a fuel return pipe 27 branching from a point partway along the fuel supply pipe 26, the fuel return pipe 27 has the jet pump 24 provided on the extremity thereof, and the pressure regulator 23 retains the pressure of fuel supplied to the engine at a constant level and returns surplus fuel to the interior of the first chamber 19 via the jet pump 24, thus maintaining a state in which the interior of the first chamber 19 is always filled with fuel.

On the other hand, a second opening 11f formed in an upper wall 11e of the second tank chamber 15 is closed by a second cover body 31 welded thereto by vibration welding, etc. An upper part of a second chamber 33 is fixed to lower parts of a plurality of guide rods 32 vertically slidably supported on a lower face of the second cover body 31, and a lower face of the second chamber 33, which is downwardly urged by means of the resilient force of coil springs 34 provided on the outer periphery of the guide rods 32, abuts against an upper face of the bottom wall of the second tank chamber 15. The second chamber 33 is provided with a flap (not illustrated) for allowing fuel to flow into the interior thereof and preventing fuel from flowing out to the exterior thereof, and the interior of the second chamber 33 is maintained in a state in which it is always filled with fuel.

A fuel suction pipe 36 extending from a suction filter 35 disposed on a base part of the second chamber 33 passes from the second tank chamber 15 through the communication portion 11b, extends into the first tank chamber 14, and is connected to the jet pump 24 in the interior of the first chamber 19.

Therefore, when the fuel pump 21 of the pump module 25 is operated during running of the engine, fuel within the first chamber 19 of the first tank chamber 14 is pumped up via the suction filter 22 and supplied to the engine via the fuel supply pipe 26, and surplus fuel is returned to the first chamber 19 via the pressure regulator 23 and the jet pump 24 of the fuel return pipe 27. By means of negative pressure generated in the jet pump 24, fuel within the second chamber 33 of the second tank chamber 15 is pumped up via the suction filter 35 and sucked into the first chamber 19 of the first tank chamber 14 via the fuel suction pipe 36 and the jet pump 24.

When the fuel liquid level within the tank main body 11 is higher than the upper end of the recess 11a, since fuel liquid levels of the first and second tank chambers 14 and 15 are equalized via the communication portion 11b, the above-mentioned suction of fuel by the jet pump 24 has no significance. However, when the fuel liquid level within the tank main body 11 falls below the upper end of the recess 11a, since fuel of the second tank chamber 15 cannot move to the first tank chamber 14 via the communication portion 11b, fuel of the second tank chamber 15 is not consumed, only fuel of the first tank chamber 14 is consumed, and there is a possibility that the fuel liquid level of the first tank chamber 14 will decrease and the supply of fuel to the engine might be discontinued at an early stage.

However, as described above, due to fuel of the second tank chamber 15 being supplied to the first tank chamber 14 via the jet pump 24 it is possible to always maintain the fuel liquid level of the second tank chamber 15 at a high position and use up the fuel within the tank main body 11 to the end.

The fuel suction pipe 36 is provided with four wave suppression members 37, and when the fuel liquid level in the interior of the tank main body 11 starts to be agitated by rocking of the vehicle, the wave suppression members 37 function so as to suppress movement of fuel and stabilize the fuel liquid level.

Figure 2:
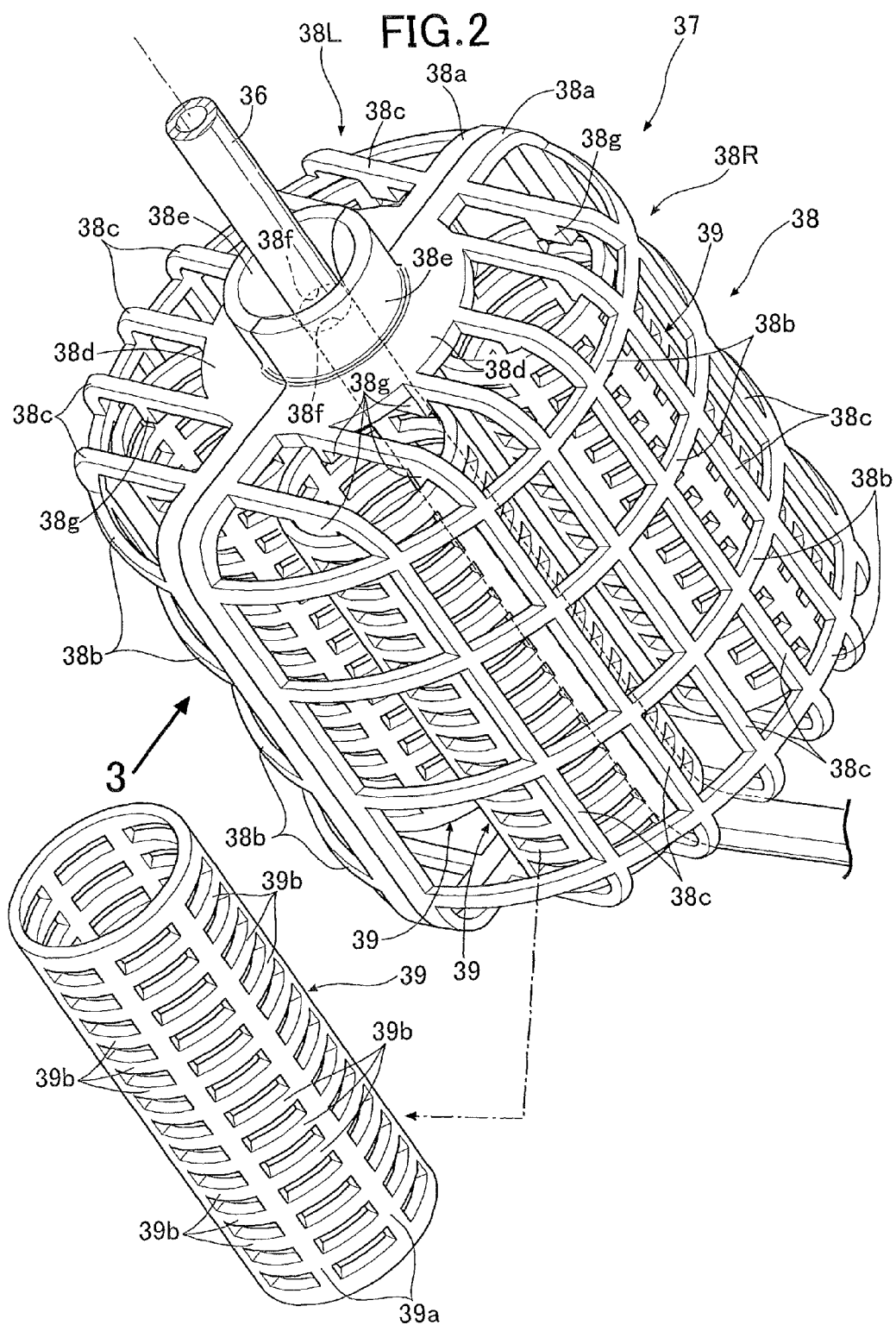
FIG. 2 is a view from arrowed direction 2 in FIG. 1. (first embodiment)
Figure 3:
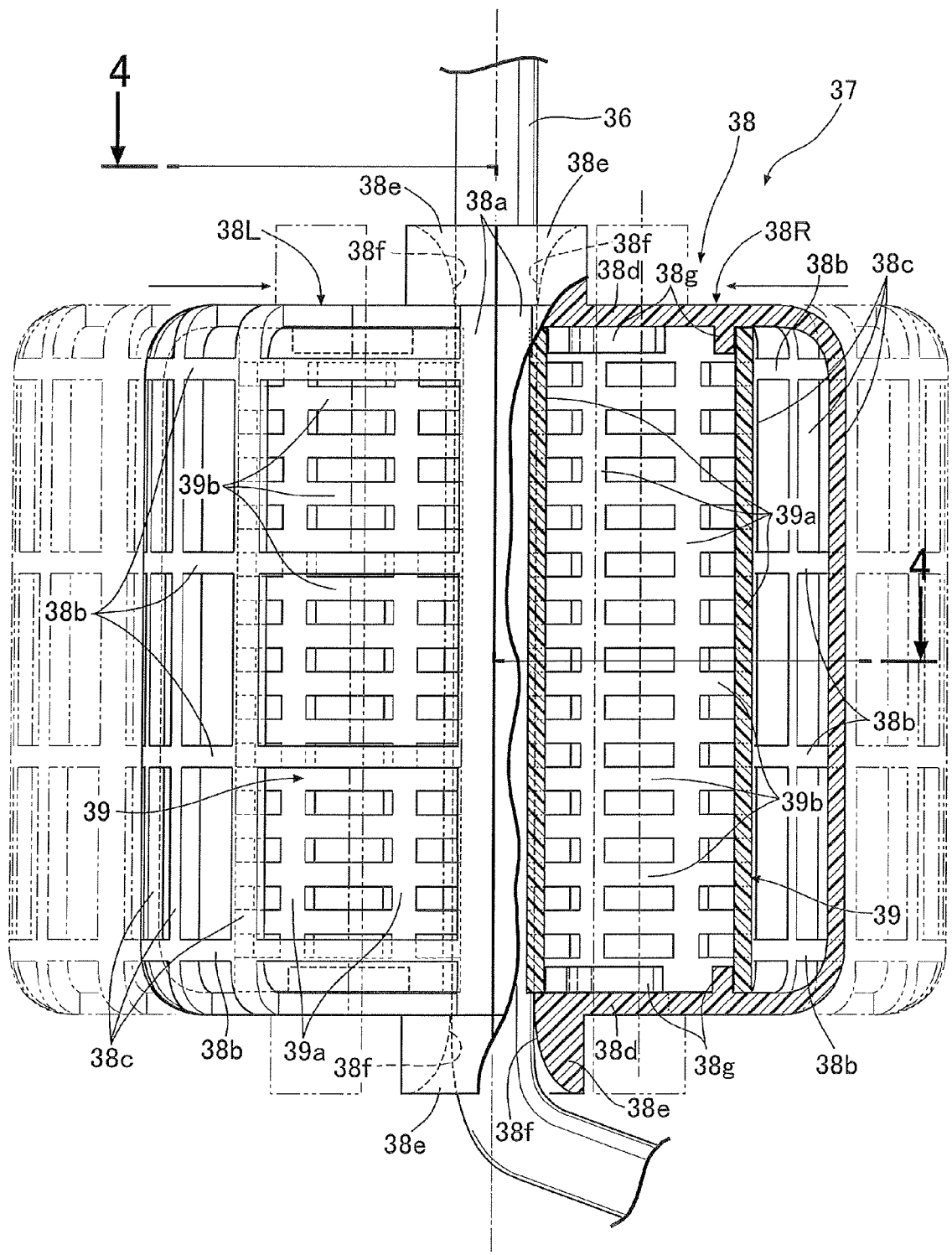
FIG. 3 is a view from arrowed direction 3 in FIG. 2. (first embodiment)
Figure 4:
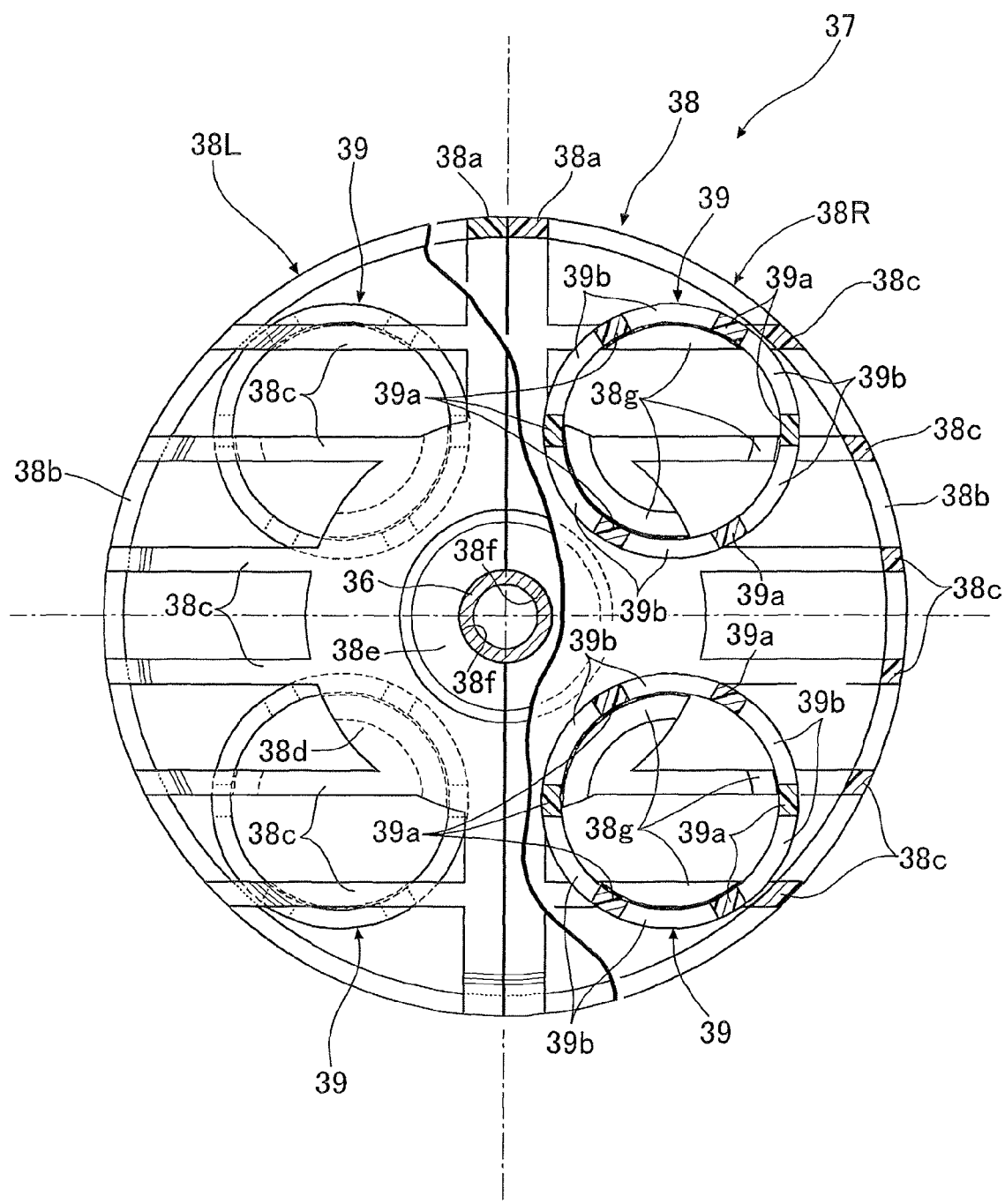
FIG. 4 is a sectional view along line 4-4 in FIG. 3. (first embodiment)

As shown in FIG. 2 to FIG. 4, the wave suppression member 37 includes a substantially cylindrical basket-shaped container 38. The basket-shaped container 38 is divided into two members that are the same as each other, that is, first and second half bodies 38L and 38R, and the two are unified by adhesion or welding. For example, the first half body 38L includes a rectangular frame-shaped joining rib 38a joined to the second half body 38L, four arc-shaped transverse ribs 38b connecting the joining rib 38a in the peripheral direction, six U-shaped longitudinal ribs 38c connecting the joining rib 38a in the axial direction, boss portions 38d provided at axially opposite ends of the joining rib 38a, and a through hole 38f formed in a support portion 38e, which is projectingly provided in the middle of the boss portion 38d, so that the fuel suction pipe 36 can extend therethrough.

Four porous members 39 are housed in the interior of the basket-shaped container 38. The porous member 39 is a cylindrical member made of a synthetic resin, and a large number of rectangular holes are formed between a plurality of longitudinal ribs 39a and transverse ribs 39b disposed in a mesh form. Since the cylindrical porous member 39 is equipped with a large number of holes in this way, an efficacious wave suppression effect can be exhibited regardless of the direction from which fuel collides therewith.

A plurality of porous member support projections 38g are projectingly provided on the inner faces, of the boss portion 38d and the longitudinal ribs 38c, formed at axially opposite ends of the first and second half bodies 38L and 38R of the basket-shaped container 38. The porous member support projections 38g are disposed in a dispersed manner so as to form an overall annular shape, and these porous member support projections 38g are fitted into circular openings at axially opposite ends of the porous member 39. This allows two of the porous members 39 and 39 to be supported in the interior of each of the first half body 38L and the second half body 38R. Attachment of the porous members 39 to the first and second half bodies 38L and 38R may easily be carried out by resiliently deforming the first and second half bodies 38L and 38R, which are made of synthetic resin.

The first half body 38L and the second half body 38R, to each of which two of the porous members 39 and 39 have been attached in advance as described above, are made to abut against each other so that the fuel suction pipe 36 is fitted into the through holes 38f and 38f at axially opposite ends thereof, and joined to each other via the joining ribs 38a and 38a by adhesion or welding. As a result, since the wave suppression member 37 is attached to the outer periphery of the fuel suction pipe 36 in a state in which the fuel suction pipe 36 extends through the through holes 38f and 38f of the basket-shaped container 38, compared with a case in which the fuel suction pipe 36 is made to extend through the through holes 38f and 38f of an already assembled basket-shaped container 38, the ease of attachment of the wave suppression member 37 to the fuel suction pipe 36 is improved.

Furthermore, in a state in which the wave suppression member 37 is attached to the fuel suction pipe 36, the outer faces of the four porous members 39 disposed in the interior thereof oppose the inner face of the basket-shaped container 38 and the outer face of the fuel suction pipe 36. That is, since the fuel suction pipe 36 is disposed on the exterior of the cylindrical porous member 39 without extending through the interior thereof, the porous members 39 do not interfere with attachment of the wave suppression member 37 to the fuel suction pipe 36.

Thus, even if the fuel liquid level in the interior of the tank main body 11 is agitated by rocking of the vehicle, by suppressing movement of fuel by means of the wave suppression members 37 so as to stabilize the fuel liquid level, stable supply of fuel to the engine is made possible. In this process, since not only the porous members 39 of the wave suppression member 37 but also the basket-shaped container 38 itself have large numbers of holes, the wave suppression effect can be exhibited more effectively by virtue of cooperation of the porous members 39 and the basket-shaped container 38.

Figure 5:
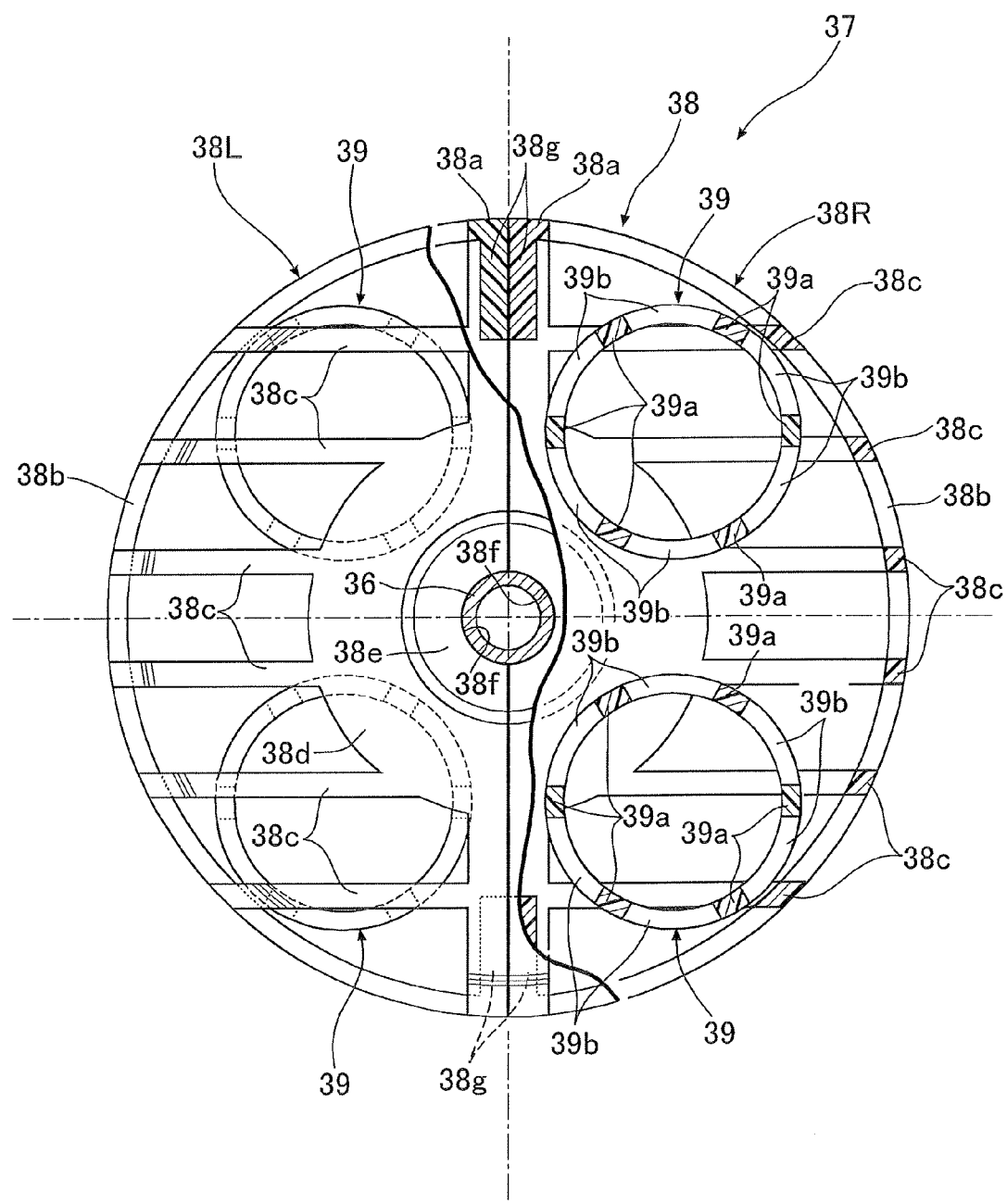
FIG. 5 is a view corresponding to FIG. 4 above. (second embodiment)

A second embodiment of the present invention is now explained by reference to FIG. 5.

Second Embodiment

In the first embodiment, the plurality of porous member support projections 38g supporting the porous members 39 are projectingly provided on the inner faces, of the longitudinal ribs 38c and the boss portions 38d and 38d, formed on the axially opposite end faces of the first and second half bodies 38L and 38R of the basket-shaped container 38, but in the second embodiment, the porous member support projections 38g are formed so as to project toward the interior of a basket-shaped container 38 from axially opposite ends of joining ribs 38a and 38a.

As a result, the porous members 39 can move to some extent in the interior of the basket-shaped container 38, but since two porous members 39 and 39 housed in a first half body 38L and two porous members 39 and 39 housed in a second half body 38R cannot pass through a gap between the porous member support projections 38g and a fuel suction pipe 36, forward and backward movement between the first and second half bodies 38L and 38R is prevented.

Embodiments of the present invention are explained in detail above, but the present invention may be modified in a variety of ways as long as the modifications do not depart from the sprit and scope thereof.

For example, the number of the porous members 39 housed in the interior of the basket-shaped container 38 is not limited to 4 as in the embodiments, and it is sufficient for it to be at least one.

Furthermore, the fuel tank T of the embodiment is equipped with the first and second tank chambers 14 and 15, but it may include a single tank chamber.

Moreover, in the embodiment, the fuel suction pipe 36 is utilized as piping for supporting the wave suppression member 37, but the piping is not limited to the fuel suction pipe 36.

The invention claimed is:

1. A fuel tank comprising a wave suppression structure, and a tank main body,
   said wave suppression structure comprising
   a wave suppression member including a basket-shaped container;
   a hollow porous member housed in said basket-shaped container, and having a large number of holes formed therein for giving resistance to passage of fuel; and
   porous member support projections projectingly provided on the basket-shaped container so as to form an overall annular shape;
   wherein:
   said wave suppression member is to be disposed in an interior portion of the tank main body;
   said basket-shaped container has through holes formed therein for permitting a piping disposed in the interior of the tank main body to extend through the through holes formed in the basket-shaped container thereby supporting the wave suppression member at a predetermined position in the fuel tank;
   the basket-shaped container is formed from two members joined for sandwiching the piping therebetween at joint surfaces of the two members;
   the porous member is housed in the basket-shaped container so that an outer face of the porous member opposes an inner face of the basket-shaped container and to oppose an outer face of the piping, the joint surfaces of the two members extending to be parallel with the piping that passes through the basket-shaped container; and
   the porous member support projections are fitted in axially opposite ends of the porous member.

2. The fuel tank according to claim 1, wherein a plurality of the porous members are housed in the interior of the basket-shaped container.

3. The fuel tank according to claim 1, wherein the porous member has a cylindrical shape.

4. The fuel tank according to claim 2, wherein the porous member has a cylindrical shape.

5. The fuel tank according to claim 1, wherein the piping is a fuel suction pipe.

6. A fuel tank comprising a wave suppression structure and a fuel suction pipe;
   said wave suppression structure comprising a wave suppression member disposed in the fuel tank;
   said wave suppression member comprising a first half body;
   a second half body; and
   a pair of porous members supported in an interior of each of the first half body and the second half body;
   wherein said wave suppression member is supported on the fuel suction pipe by joining the first half body and the second half body such that the fuel suction pipe is sandwiched between the first half body and the second half body, and such that the porous members are arranged around the fuel suction pipe; and
   wherein joint surfaces of the first half body and the second half body extend parallel to the fuel suction pipe that passes through the wave suppression member.

7. The fuel tank according to claim 6, further comprising a plurality of said wave suppression members supported on said fuel suction pipe.

* * * * *